(12) United States Patent
Yoshikawa et al.

(10) Patent No.: US 9,280,840 B2
(45) Date of Patent: Mar. 8, 2016

(54) FIGURE DISPLAY DEVICE, FIGURE DISPLAY METHOD AND STORAGE MEDIUM STORING A FIGURE DISPLAY PROGRAM

(71) Applicant: CASIO COMPUTER CO., LTD., Shibuya-ku, Tokyo (JP)

(72) Inventors: Hironori Yoshikawa, Hamura (JP); Tomoaki Satoh, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 337 days.

(21) Appl. No.: 13/845,504

(22) Filed: Mar. 18, 2013

(65) Prior Publication Data
US 2013/0241932 A1   Sep. 19, 2013

(30) Foreign Application Priority Data
Mar. 19, 2012   (JP) ................................. 2012-061332

(51) Int. Cl.
| | |
|---|---|
| *G06T 11/20* | (2006.01) |
| *G06F 17/11* | (2006.01) |
| *G06T 11/60* | (2006.01) |
| *G06F 17/10* | (2006.01) |
| *G09B 19/02* | (2006.01) |
| *G06F 15/02* | (2006.01) |

(52) U.S. Cl.
CPC .......... *G06T 11/206* (2013.01); *G06F 15/0225* (2013.01); *G06F 17/10* (2013.01); *G06T 11/60* (2013.01); *G09B 19/025* (2013.01)

(58) Field of Classification Search
CPC ...... G06T 11/206; G06F 3/0481; G06F 17/11
See application file for complete search history.

(56) References Cited

U.S. PATENT DOCUMENTS

| | | | |
|---|---|---|---|
| 5,584,699 A | 12/1996 | Silver | |
| 7,289,120 B2 * | 10/2007 | Fukaya | .......................... 345/440 |
| 2004/0227738 A1 * | 11/2004 | Sudoh | ........................... 345/173 |

(Continued)

FOREIGN PATENT DOCUMENTS

| | | |
|---|---|---|
| JP | 2004-294689 A | 10/2004 |
| JP | 2009-009059 A | 1/2009 |

OTHER PUBLICATIONS

Australian Office Action dated Apr. 3, 2014 issued in counterpart Australian Application No. 2013201638.

(Continued)

*Primary Examiner* — Matthew D Salvucci
(74) *Attorney, Agent, or Firm* — Holtz, Holtz & Volek PC

(57) ABSTRACT

A figure display device, a figure display method and a storage medium having a figure display program are described. According to one implementation, a figure display device includes a figure display section; an assumed equation input section; and a figure assumed portion discrimination display control section. The figure display section displays a figure. The assumed equation input section is used to input an assumed equation of the figure according to user operation. The figure assumed portion discrimination display control section deforms a corresponding portion of the assumed equation in the figure to match a figure portion obtained by the assumed equation, and illustrates a content represented by the assumed equation in the figure displayed with discrimination.

9 Claims, 10 Drawing Sheets

(56) References Cited

U.S. PATENT DOCUMENTS

2009/0142742 A1 6/2009 Goldberg
2010/0291518 A1 11/2010 Wong et al.

OTHER PUBLICATIONS

Koedinger, et al.: "Theoretical and Empirical Motivations for the Design of ANGLE: A New Geometry Learning Environment".
"Casio Classpad Help Series", Version 7, Australian Casio Education Internet Site, Mar. 2011, http://www.classpad.com.au/pdf/CP000_Classpad_Help_Series.pdf; XP055125580; pp. 108-113 and 222-223.
Extended European Search Report dated Jul. 7, 2014 issued in counterpart European Application No. 13159916.9.
Japanese Office Action (and English translation thereof) dated Aug. 4, 2015, issued in counterpart Japanese Application No. 2012-061332.
IBM Mathematics Laboratory Series Plane Geometry Edition Geoblock, IBM Japan, Ltd., May 1992, pp. 42, 46, 94-96.
Mishima, et al., "Multiple View for Geometric Inference", 1999 Japanese Society of Artificial Intelligence National Convention (13th Proceedings), 1999, pp. 81-83.

* cited by examiner

FIG.7A

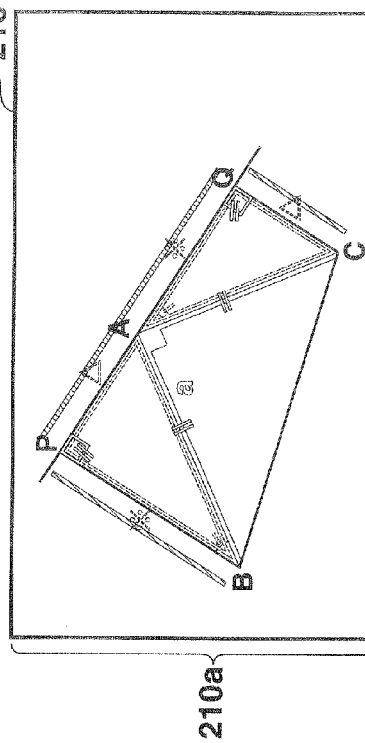

(TEXT AREA)
∠BPA=∠AQC=90° (ASSUMED) ···①
∠a=∠BAC=90° ···②
BA=CA (ASSUMED) ···③
∠PBA=∠QAC ···④
FROM ①③④, SINCE HYPOTENUSE AND ONE OTHER ACUTE ANGLE ARE EQUAL IN A RIGHT TRIANGLE
△PBA≡△QAC ···⑤
SINCE CONGRUENT FIGURE, PA=QC, PB=QA ···⑥

FIG.7B

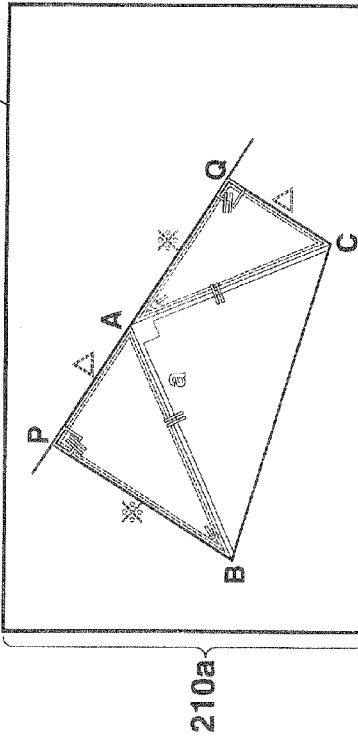

(TEXT AREA)
∠BPA=∠AQC=90° (ASSUMED) ···①
∠a=∠BAC=90° ···②
BA=CA (ASSUMED) ···③
∠PBA=∠QAC ···④
FROM ①③④, SINCE HYPOTENUSE AND ONE OTHER ACUTE ANGLE ARE EQUAL IN A RIGHT TRIANGLE
△PBA≡△QAC ···⑤
SINCE CONGRUENT FIGURE, PA=QC, PB=QA ···⑥
MOREOVER SINCE PQ=PA+QA ···⑦
PQ=PB+QC (CONCLUSION)

(TEXT AREA)

AD:BC=1:2 (ASSUMED) ⋯ (α)
AE:EB=1:3 (ASSUMED) ⋯ (β)
△AEG ∽ △ABC THEREFORE
EG:BC=1:4 (ASSUMED)
△CFG ∽ △CDA THEREFORE
AD:GF=4:3

SHOULD RATIO OF SIDES OF FIGURE AREA (AD, EG, GF, BC) BE ORGANIZED?

(TEXT AREA)

AD:BC=1:2 (ASSUMED) ⋯ (α)
AE:EB=1:3 (ASSUMED) ⋯ (β)
△AEG ∽ △ABC THEREFORE
EG:BC=1:4 (ASSUMED)
△CFG ∽ △CDA THEREFORE
AD:GF=4:3
AD:EF=4:5 (CONCLUSION)

FIGURE DISPLAY DEVICE, FIGURE DISPLAY METHOD AND STORAGE MEDIUM STORING A FIGURE DISPLAY PROGRAM

BACKGROUND OF THE INVENTION

1. Field of the Invention

The present invention relates to a figure display device, a figure display method, and a storage medium storing a figure display program.

2. Description of the Related Art

Conventionally, figure display devices which can display figures have been used for studying geometry.

In one such figure display device, for example, when a user answers a proof problem of figures, a figure area to display a figure and a text area to display text for proof input by the user is formed in a display region, and it is possible for the user to draw a desired auxiliary line in the figure area (for example, patent document 1: Japanese Patent Application Laid-Open Publication No. 2009-009059)

As another figure display device there is a device which displays with discrimination line segments with the same length and corner portions with the same angle in the displayed figure (for example, patent document 2: Japanese Patent Application Laid-Open Publication No. 2004-294689)

However, according to the techniques of patent document 1 and patent document 2, the corresponding relationship between the displayed figure and the formula in the text input by the user is difficult to understand. Therefore, the effect of learning becomes small.

SUMMARY OF THE INVENTION

The present invention has been made in consideration of the above situation, and one of the main objects is to provide a figure display device, a figure display method, and a storage medium storing a figure display program in which effect of learning is enhanced compared to conventional practice.

In order to achieve any one of the above advantages, according to an aspect of the present invention, there is provided a figure display device including:

a figure display section which displays a figure;

an assumed equation input section to input an assumed equation of the figure according to user operation; and a figure assumed portion discrimination display control section which deforms a corresponding portion of the assumed equation in the figure to match a figure portion obtained by the assumed equation, and which illustrates a content represented by the assumed equation in the figure displayed with discrimination,

BRIEF DESCRIPTION OF THE DRAWINGS

The present invention and the above-described objects, features and advantages thereof will become more fully understood from the following detailed description with the accompanying drawings and wherein;

FIG. 7A and FIG. 7B are diagrams showing contents displayed on the display;

DETAILED DESCRIPTION OF THE PREFERRED EMBODIMENT

An example of an embodiment of the present invention is described in detail with reference to the attached drawings. The scope of the invention is not limited to the illustrated examples.

Configuration

Figure 1:
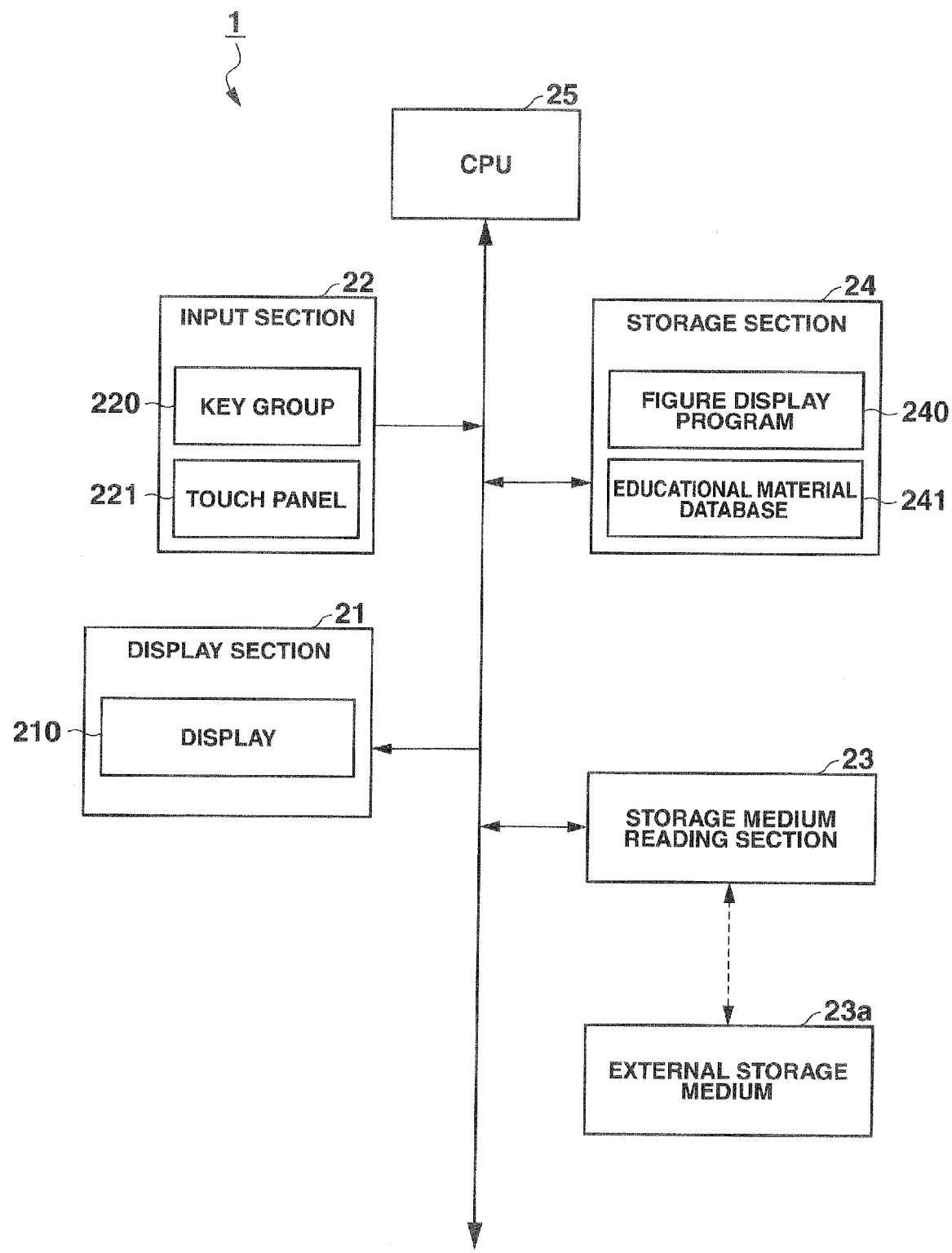
FIG. 1 is a block diagram showing a functional configuration of a display terminal.

FIG. 1 is a block diagram showing a schematic configuration of a display terminal 1 of the present embodiment.

As shown in the diagram, the display terminal 1 of the present embodiment includes a display section 21, an input section 22, a storage medium reading section 23, a storage section 24, a CPU 25 and the like.

The display section 21 includes a display 210, and displays various pieces of information on the display 210 based on the display signal input from the CPU 25. The display 210 of the present embodiment is formed as one with a touch panel 221, and is able to receive touching operation from the user.

The input section 22 includes a key group 220 and the above described touch panel 221, and outputs a signal corresponding to the type of pressed key or the position of the touch panel 221 to the CPU 25.

The storage medium reading section 23 reads information from an external storage medium 23e such as a SD card, and stores information in the external storage medium 23a.

The storage section 24 stores programs and various pieces of data to execute various functions of the display terminal 1. The storage section 24 is also a memory which functions as a work area of the CPU 25. In the present embodiment, the storage section 24 stores a figure display program 240, an educational material database 241, etc. of the present invention.

The figure display program 240 is a program which allows the CPU 25 to execute a later described figure display processing (see FIG. 2).

The educational material database 241 stores a plurality of pieces of educational material data.

The CPU 25 centrally controls each section of the display terminal 1. Specifically, the CPU 25 expands a system program and the program specified from the various application programs stored in the storage section 24. In coordination with the expanded program, the CPU 25 executes various processing, Figure Display Processing Next, the figure display processing executed by the display terminal 1 is described with reference to FIG. 2.

Figure 2:
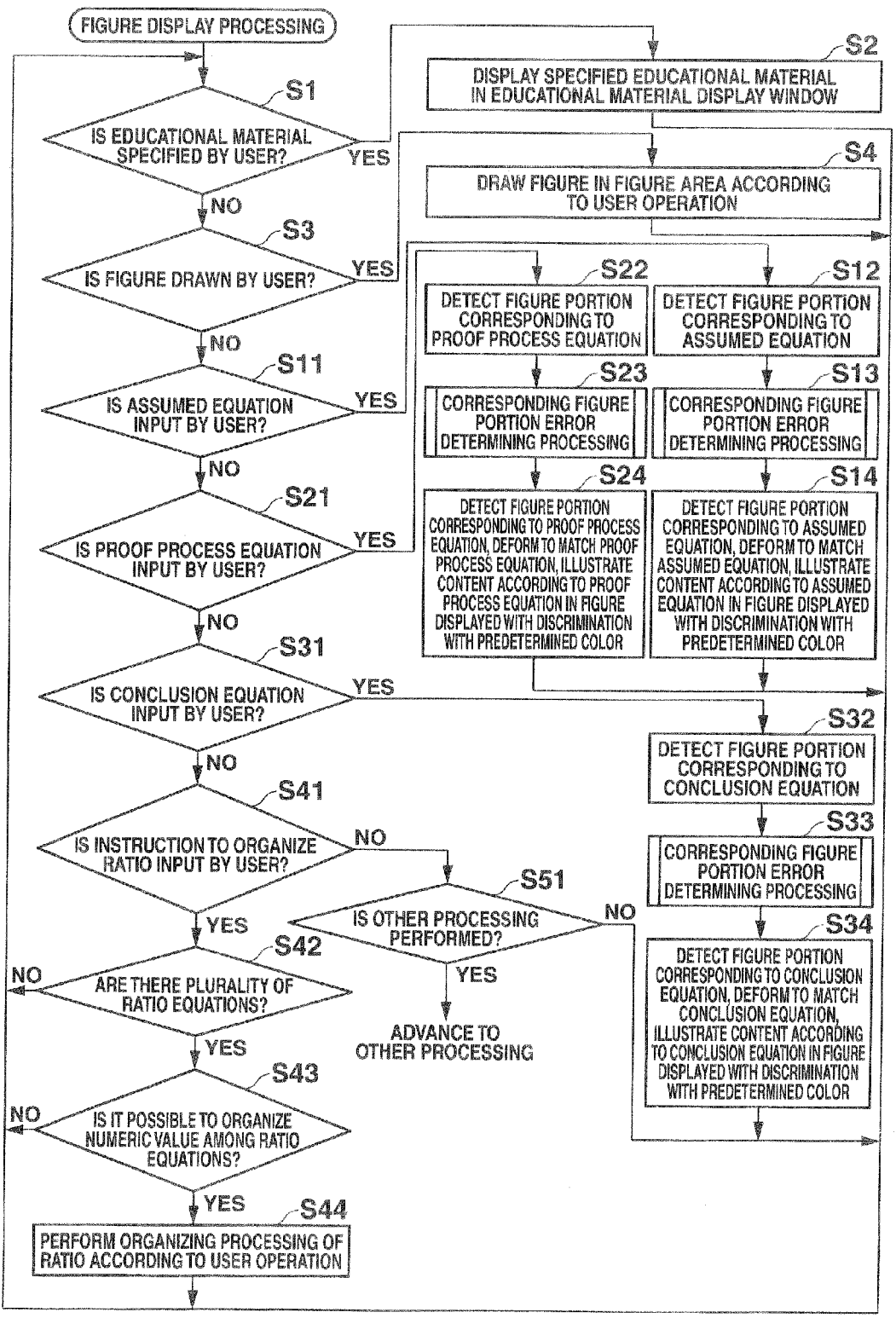
FIG. 2 is a flowchart showing a flow of figure display processing.

FIG. 2 is a flowchart, which describes an operation of the figure display processing. When an instruction to execute the figure display processing is input through the input section 22 by the user, the figure display program 240 is read from the storage section 24 and expanded. As a result, the figure display processing is executed by the figure display program 240 in coordination with the CPU 25.

As shown in the diagram, in the figure display processing, the CPU 25 first judges whether the operation to specify the educational material regarding a figure problem of geometry is performed by the user (step S1).

When it is judged that the operation to specify the educational material regarding figures is performed in step S1 (step S1; Yes), the CPU 25 forms a figure area 210a and a text area 210b on the display 210 and displays an educational material display window W in a nearer side than the above areas (see FIG. 4A). Then, the CPU 25 reads the educational material specified above (hereinafter referred to as specified educational material) from the educational material database 241 to be displayed in the educational material display window W (step S2), and the processing advances to step S1.

When it is judged that the operation to specify the educational material regarding figures is not performed in step S1 (step S1; No), the CPU 25 judges whether or not the operation to draw a figure is performed by the user (step S3).

When it is judged that the operation to draw the figure is performed by the user in step S3 (step S3; Yes), the CPU 25 displays the figure drawn according to user operation (hereinafter referred to as user drawn figure) to solve the specified educational material in the figure area 210a (step S4). Then, the CPU 25 advances the processing to step S1. The user drawn figure includes signs of feature points in the figure such as an intersection point, vertex, center of circle and the like, and the CPU 25 acknowledges the feature point closest to the position where the sign is described as the target of the sign.

When it is judged that the operation to draw the figure is not performed by the user in step S3 (step S3; No), the CPU 25 judges whether or not operation to input an assumed equation regarding a figure of the specified educational material (hereinafter referred to as educational material figure) is performed by the user (step S11).

When it is judged that the operation to input the assumed equation is performed by the user in step S11, (step S11; Yes), the CPU 25 displays the assumed equation input according to the user operation discriminated with a predetermined color (here, red) in the text area 210b and also detects the corresponding portion of the assumed equation in the user drawn figure (step 812). In step S12, the user may input an equation regarding a ratio of a portion (side, angle, etc.) of the figure (hereinafter referred to as ratio equation) as the assumed equation.

Next, the CPU 25 performs corresponding figure portion error determining processing (step S13).

Figure 3:
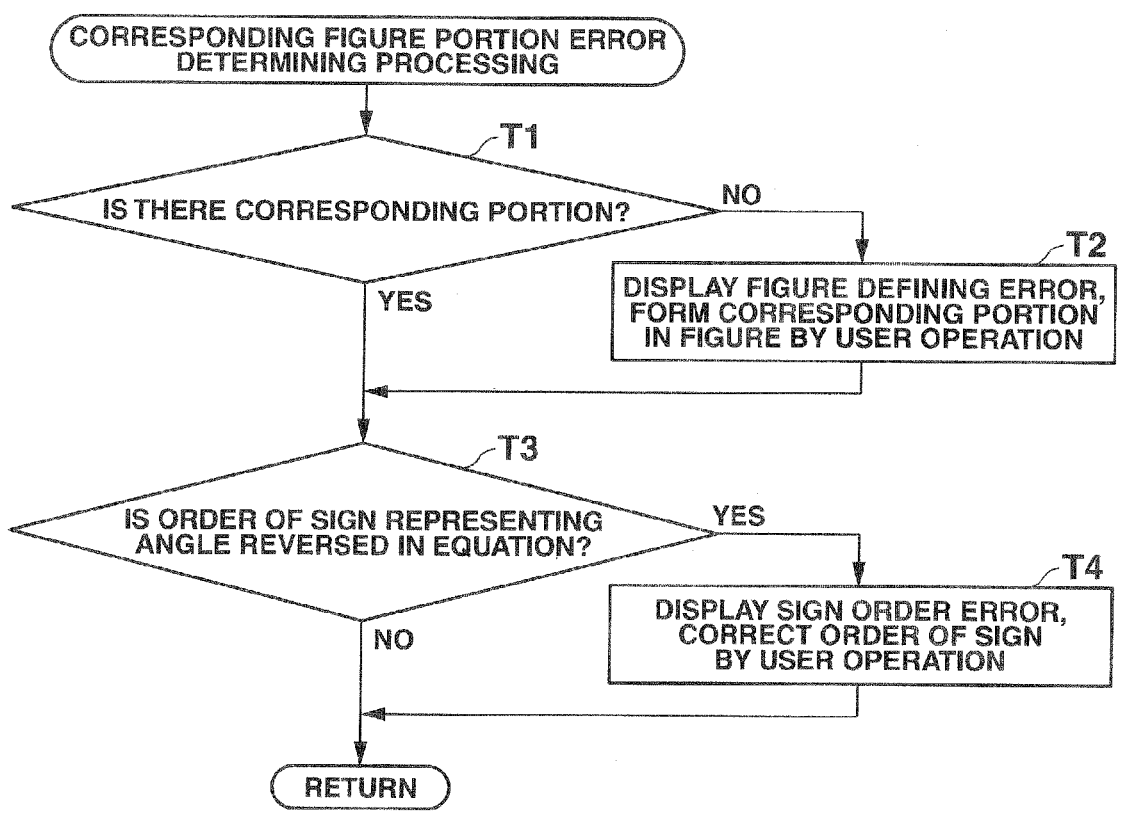
FIG. 3 is a flowchart showing a flow of corresponding figure portion error determining processing.

Specifically, as shown in FIG. 3, in the corresponding figure portion error determining processing, the CPU 25 judges whether or not there is a corresponding portion of the assumed equation in the user drawn figure, specifically, the CPU 25 judges whether or not the signs in the assumed equation are defined in the user drawn figure (step T1), and when it is judged that there is a corresponding portion (the signs are defined) (step T1; Yes), the processing advances to a later described step T3.

When it is judged that the corresponding portion of the assumed equation is not in the user drawn figure (the signs are not defined) in step T1 (step T1; No), the CPU 25 displays an error message (hereinafter referred to as figure defining error message M1, see FIG. 5A) notifying the above on the display 210 and forms the portion corresponding to the sign not defined in the user drawn figure according to the user operation (step T2).

Next, the CPU 25 judges whether or not the assumed equation for at least two angles in a congruent figure portion or a similar figure portion in the user drawn figure is input, and whether or not the order of the sign representing these angles is reversed in, the assumed equation (step T3). When the assumed equation for the angles is not input or the order of the sign is not reversed (step T3; No), the corresponding figure portion error determining processing ends.

When it is judged that the assumed equation for at least two angles in the congruent figure portion or the similar figure portion is input and it is judged that the order of the sign representing the angles is reversed in the assumed equation (step T3; Yes), the CPU 25 displays on the display 210 an error message (hereinafter referred to as sign order error message M2, see FIG. 6A) notifying the above and a query message M3 regarding whether or not to correct the order. After correcting the order according to the user operation to correct the order (step T4), the corresponding figure portion error determining processing ends. In step T4, when the user does not perform operation to correct the order, the CPU 25 ends the corresponding figure portion error determining processing without correcting the order.

When the corresponding figure portion error determining processing ends in step S13, as shown in FIG. 2, next the CPU 25 again detects the corresponding portion of the assumed equation in the user drawn figure, deforms the corresponding portion to match a figure portion obtained by the assumed equation and illustrates the content represented by the assumed equation in the user drawn figure to be displayed with discrimination in the color the same as the assumed equation (here, red) (step S14). Then, the processing advances to the above described step S1. In step S14 and the later described steps S24, S34, when the equation is a ratio equation, the CPU 25 deforms the corresponding portion of the ratio equation in the user drawn figure to match a figure portion obtained by the ratio equation and the numeric value of each term of the ratio equation is illustrated in the mark (circle, reverse triangle, etc.) for each ratio equation in the corresponding portion in the user drawn figure.

When it is judged that the operation to input the assumed equation is not performed by the user in step S11 (step S11; No), the CPU 25 judges whether or not the operation to input a proof process equation regarding the educational material figure is performed by the user (step S21).

When it is judged that the operation to input the proof process equation is performed by the user in step S21 (step S21; Yes), the CPU 25 displays with discrimination the proof process equation input according to the user operation with a predetermined color (here, blue) in the text area 210b and after detecting the corresponding portion of the proof process equation in the user drawn figure (step S22), the figure portion error determining processing similar to the above described step S13 is performed (step S23). The user in step S22 may input the ratio equation of the figure portion as the proof process equation. The CPU 25 in the corresponding figure error determining processing of step 23 uses the proof process equation instead of the assumed equation.

Then, when the corresponding figure portion error determining processing ends in step S23, next the CPU 25 detects again the corresponding portion of the proof process equation in the user drawn figure, deforms the corresponding portion to match a figure portion obtained by the proof process equation, and illustrates in the user drawn figure the content represented by the proof process equation displayed with discrimination with the same color (here, blue) as the proof process equation (step S24). Then, the processing advances to the above described step S1.

When it is judged that the operation to input the proof process equation is not performed by the user in step S21 (step S21; No), the CPU 25 judges whether or not the operation to input a conclusion equation regarding the educational material figure is performed by the user (step S31).

In step S31, when it is judged the operation to input the conclusion equation is performed by the user in step S31 (step S31; Yes), the CPU 25 displays with discrimination the conclusion equation input according to user operation with a predetermined color (here, green) in the text area 210b, and after detecting the corresponding portion of the conclusion equation, in the user drawn figure (step S32), the corresponding figure portion error determining processing similar to the above described step S13 is performed (step S33). The user in step S32 can input the ratio equation regarding the portion in the figure as the conclusion equation. The CPU 25 in the corresponding figure error determining processing in step S33 uses the conclusion equation instead of the assumed equation.

Then, when the corresponding figure portion error determining processing in step S33 ends, next, the CPU 25 detects again the corresponding portion of the conclusion equation in the user drawn figure, deforms the corresponding portion to match a figure portion obtained by the conclusion equation, and illustrates in the user drawn figure the content represented by the conclusion equation displayed with discrimination in the same color (here, green) as the conclusion equation (step S34). Then, the processing advances to the above described step S1.

When it is judged that the operation to input the conclusion equation is not performed by the user in step S31 (step S31; No), the CPU 25 judges whether or not at least one of the assumed equation, the proof process equation and the conclusion equation is input as the ratio equation and whether or not the operation to organize the numeric value in the ratio equation is performed by the user (step S41).

When it is judged that the ratio equation is input and the operation to organize the numeric value is performed by the user in step S41 (step S41; Yes), the CPU 25 judges whether or not a plurality of ratio equations are input (step S42) and when it is judged that a plurality is not input (step S42; No), the processing advances to step S1.

When it is judged that a plurality of ratio equations are input in step S42 (step S42; Yes), the CPU 25 judges whether or not it is possible to organize the numeric values among the ratio equations, specifically, whether or not the terms representing the portion of the figure is common in at least two ratio equations among the plurality of input ratio equations (step S43).

When it is judged that there is no common term representing the portion of the figure in any two ratio equations among the plurality of input ration equations in step S43 (step S43; No), the CPU 25 advances the processing to step S1.

When it is judged that there is a common term representing the portion of the figure in at least two ratio equations among the plurality of input ratio equations in step S43 (step S43; Yes), the CPU 25 organizes the numeric value of the term in the ratio according to user operation and after the numeric value of the term in the ratio in the figure area 210a is updated (step S44), the processing advances to step S1. Here, to organize the numeric value of the term in the ratio is to multiply by integers each numeric value of the term in the ratio equations so that the numeric value of each term in the relating ratio equations become numeric values of a term in a common ratio equation (for example, in a later described FIG. 9B, x, y, z, w of AD:GF:EG:BC=x:y:z:w). Specifically, the numeric value of the term in the ratio of AD is set to 4 according to AD:GF=4:3 in FIG. 9B. Next, the numeric value of the term in the ratio of BC is set to 8 from AD:BC=1:2. Further, the numeric value of the term in the ratio of EG is set to 2 from EG:BC=1:4. The above values are displayed in each corresponding position in the figure with the numeric value surrounded by a circle as the value of the common ratio equation (values "4, 3, 2, 8" of the common ratio equation "AD:GF:EG:BC=4:3:2:8").

When it is judged in step S41 that the ratio equation is not input or the operation to organize the numeric value of the term in the ratio equation is not performed by the user (step S41; No), the CPU 25 judges whether or not the operation to execute other processing is performed by the user (step S51).

Then, when it is judged that the operation to execute other processing is not performed by the user in step S51 (step S51; No), the CPU 25 advances the processing to step S1. When it is judged that the above operation is performed (step S51; Yes), the processing advances to other processing.

OPERATION EXAMPLE

Next, the operation of the display terminal 1 is specifically described with reference to the drawings. The drawings referred in the operation example described below illustrate the characters and the figure portion displayed in red outlined with a solid line and colored white inside. Similarly, the characters and the figure portion displayed in blue are illustrated outlined with a broken line and colored white inside, and the characters and the figure portion displayed in green are illustrated outlined with a solid line and hatched with a diagonal line inside.

Operation Example 1

Figure 4A:
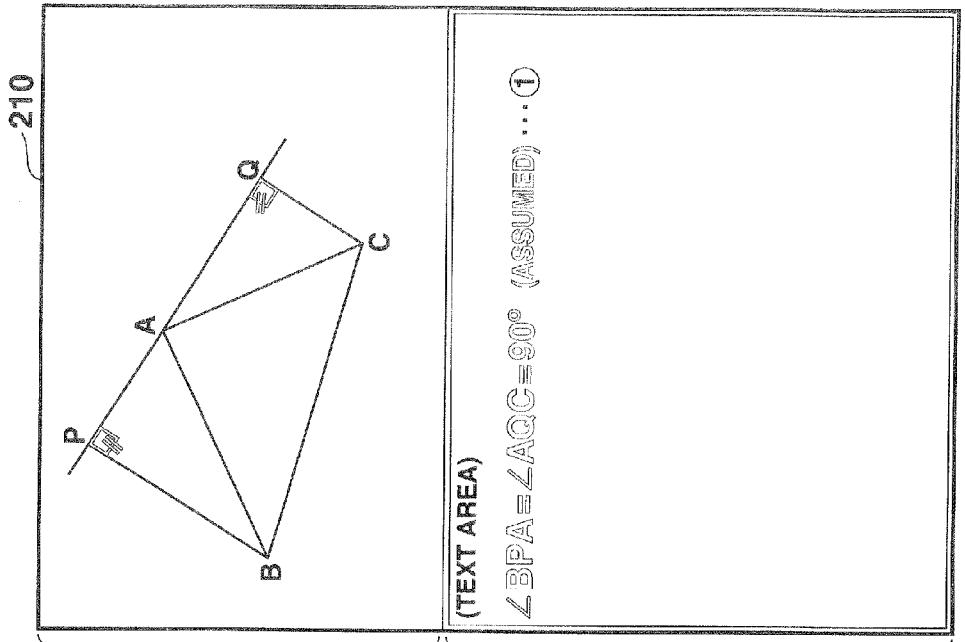
FIG. 4A and FIG. 4B are diagrams showing contents displayed on a display.

First, when the user performs the operation to specify educational material of a proof problem of a figure (step S1; Yes), as shown in FIG. 4A, the figure area 210a and the text area 210b are formed on the display 210, the educational material display window W is displayed in a nearer side than the above areas and the specified educational material is displayed in the educational material display window W (step S2).

Next, when the user performs the operation to draw the figure (step S3; Yes) the user drawn figure drawn according to user operation is displayed in the figure area 210a (step S4). To be accurate, the user drawn figure may be a shape different from the educational material figure in the educational material display window W.

Figure 4B:
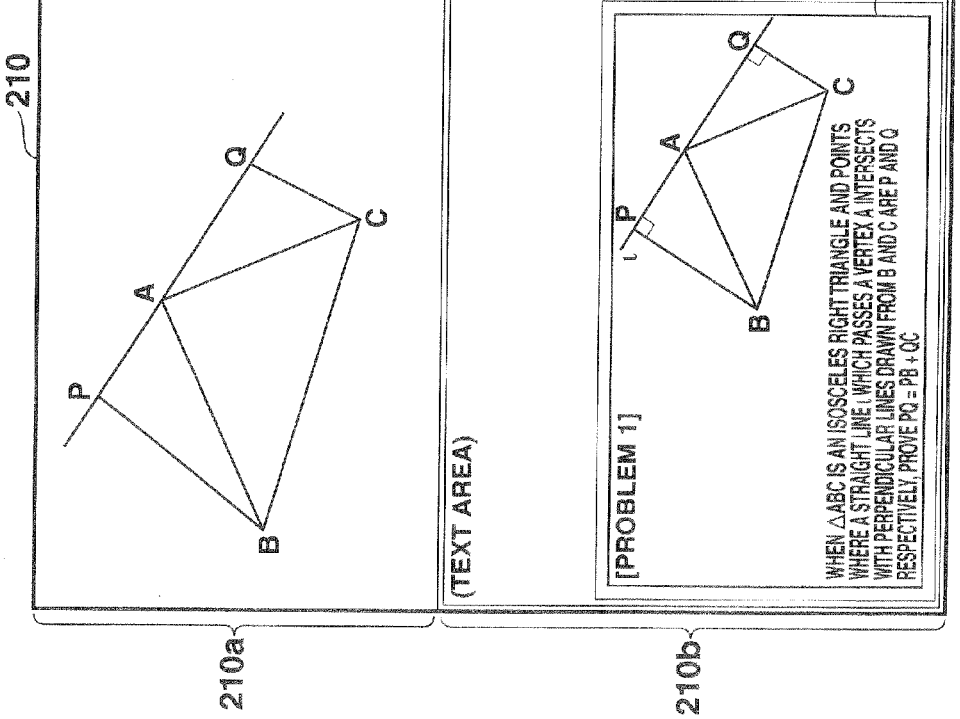

Next, when the user performs operation to input the assumed equation (step S11; Yes), as shown in FIG. 4B, the assumed equation "$\angle BPA = \angle AQC = 90°$ (assumed)" input according to user operation is displayed with discrimination in red in the text area 210b (step S12). In the present operation example, when the user inputs the equation, the number of the equation is automatically added to the end of the equation.

Then, the corresponding portions "$\angle BPA$", "$\angle AQC$" of the assumed equation "$\angle BPA = \angle AQC = 90°$ (assumed)" are detected in the user drawn figure, the corresponding portions are deformed to match a figure portion obtained by the assumed equation, and the content represented by the assumed equation is illustrated in the user drawn figure displayed with discrimination in red. Specifically, a square (right angle mark) is displayed with discrimination in red in the portion of $\angle BPA$ and the portion of $\angle AQC$ in the figure and an equal angle mark is added to each square (right angle mark) (step S14).

Figure 5B:
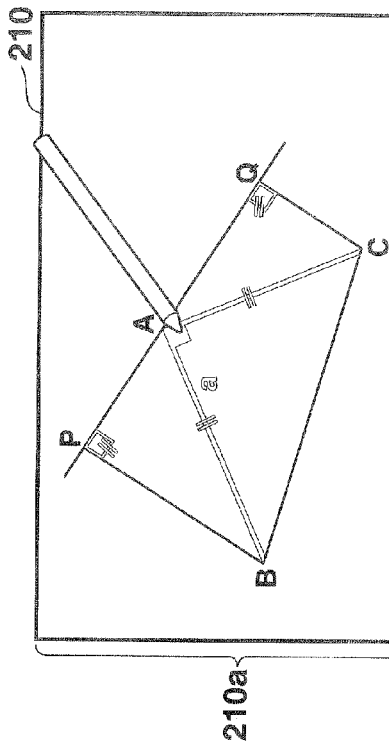
FIG. 5A and FIG. 5B are diagrams showing contents displayed on the display.
Figure 5A:
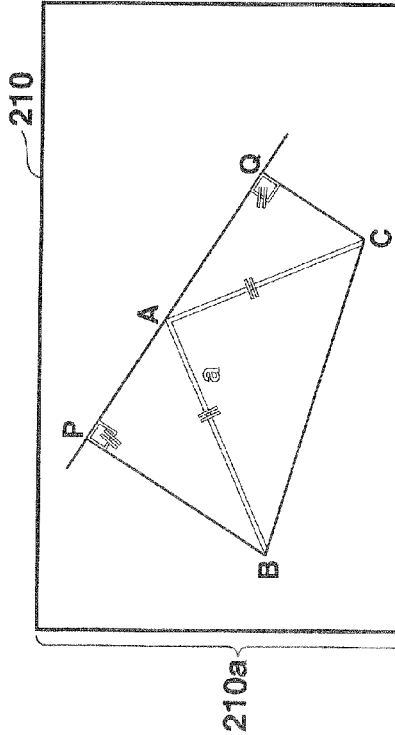

Next, when the user performs the operation to input the assumed equation (step S11; Yes), as shown in FIG. 5A, the assumed equation "$\angle a = 90°$ (assumed)" input according to user operation is displayed with discrimination in red in the text area 210b and the corresponding portion "∠=a" of the assumed equation is detected in the user drawn figure (step 12).

Next, it is judged that the corresponding portion of the assumed equation "∠a=90° (assumed)" does not exist in the user drawn figure (the sign "a" is not defined in the assumed equation) (step T1; No), and the figure defining error message M1 is displayed on the display 210 and as shown in FIG. 5B, the corresponding portion of the undefined sign "a" is formed in the user drawn figure according to user operation (step T2). In the operation example, the figure defining error message M1, the sign order error message M2 and the error portion of the equation is displayed with the marker in the same color (for example, yellow).

Then, the corresponding portion "∠a" of the assumed equation "∠a=90° (assumed)" is detected again in the user drawn figure, the corresponding portion is deformed to match a figure portion obtained by the assumed equation, and the content represented by the assumed equation is illustrated in the user drawn figure displayed with discrimination in red (see right angle symbol in diagram, step S14). In the operation example, when "∠a" is drawn again in the user drawn figure, it is detected that "∠a" and "∠BAC" are the same portion. Therefore, "=∠BAC" is added in the assumed equation "∠a=90° (assumed)".

Next, when the user performs operation to input the assumed equation (step S11; Yes), the assumed equation "BA=CA (assumed)" input according to user operation is displayed with discrimination in red in the text area 210b (step S12).

Then, the corresponding portions "BA", "CA" of the assumed equation "BA=CA (assumed)" are detected in the user drawn figure, the corresponding portions are deformed to match a figure portion obtained by the assumed equation, and the content represented by the assumed equation is illustrated in the user drawn figure displayed with discrimination in red. Specifically, the side BA and the side CA are displayed with discrimination in red and an equal length symbol is displayed (step S14).

Figures 6A, 6B:
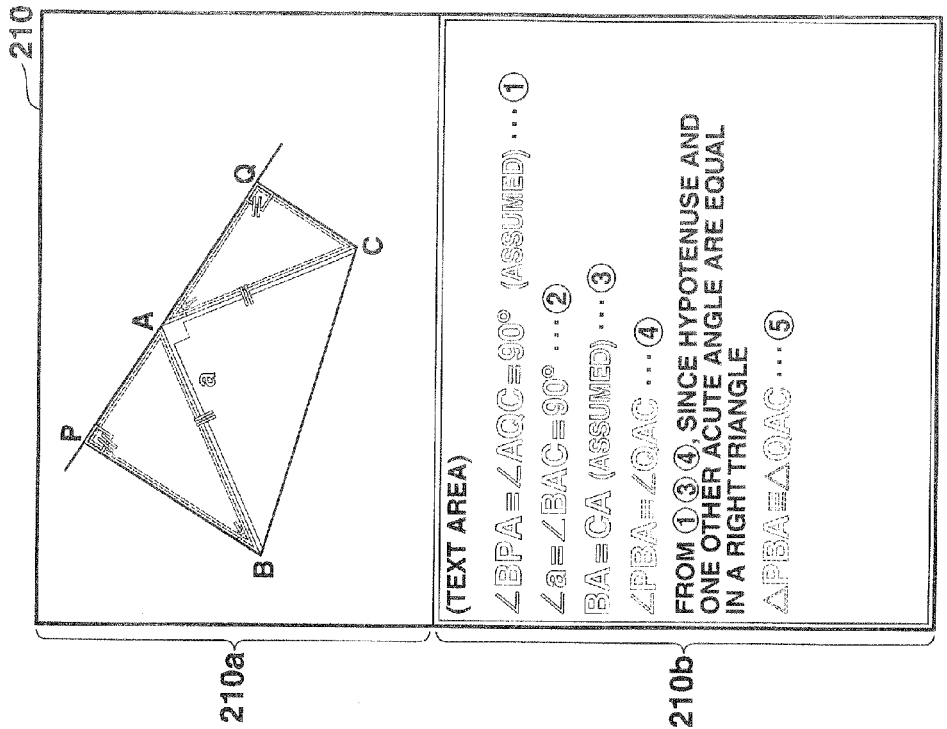
FIG. 6A and FIG. 6B are diagrams showing contents displayed on the display.

Next, when the user performs operation to input the proof process equation (step S21; Yes), as shown in FIG. 6A, the proof process equation. "∠PBA=∠CAQ" input according to user operation is displayed with discrimination in blue in the text area 210b and the corresponding portion of the proof process equation is detected in the user drawn figure (step S22).

Next, it is judged that the proof process equation regarding the two angles "∠PBA" and "∠CAQ" in the similar figure portion (ΔABP and ΔCAQ) in the user drawn figure is input and the order of the sign representing theses angles is reversed in the proof process equation "∠PBA=∠CAQ" (step T3; Yes), and the sign order error message M2 and the query message M3 of whether or not to make a correction are displayed on the display 210.

Next, when the user performs the operation to make a correction, as shown in FIG. 6B, the order of the sign of "∠CAQ" is corrected to "∠QAC" (step T4).

Then, the corresponding portion of the proof process equation "∠PBA=∠QAC" is detected again in the user drawn figure, the corresponding portion is deformed to match a figure portion obtained by the proof process equation, and the content represented by the proof process equation is illustrated in the user drawn figure displayed with discrimination in blue. Specifically, an equal angle symbol is added to the portion of ∠PBA and the portion of ∠QAC in the figure and each equal angle symbol is displayed with discrimination in blue (step S24).

Next, when the user performs operation to input the proof process equation (step S21; Yes), the proof process equation "ΔPBA=ΔQAC" input according to user operation is displayed with discrimination in blue in the text area 210b and the corresponding portion of the proof process equation in the user drawn figure is detected (step S22).

Then, the corresponding portions "ΔPBA", "ΔQAC" of the proof process equation "ΔPBA=ΔQAC" are detected in the user drawn figure, the corresponding portions are deformed to match a figure portion obtained by the proof process equation, and the content represented by the proof process equation is illustrated in the user drawn figure displayed with discrimination in blue. Specifically, on the inside of ΔPBA and ΔQAC, a triangle a little smaller showing the triangles are congruent is drawn and displayed with discrimination in blue (step S24).

Similarly, when the user performs operation to input the proof process equation (step S21; Yes), as shown in FIG. 7A, the proof process equation "PA=QC", "PB=QA" input according to the user operation are displayed with discrimination in blue in the text area 210b and the corresponding portion of the proof process equation is detected in the user drawn figure (step S22).

Then, the corresponding portions of the proof process equations "PA=QC", "PB=QA" are detected in the user drawn figure and the corresponding portions are deformed to match a figure portion obtained by the proof process equation and the content represented by the proof process equation is illustrated in the user drawn figure and displayed with discrimination in blue. Specifically, an equal length symbol Δ is added to the side PA and the side QC, an equal length symbol X is attached to the side PB and the side QA, and each is displayed with discrimination in blue (step S24).

Next, when the user performs operation to input the conclusion equation (step S31; Yes), as shown in FIG. 7B, the conclusion equation "PQ=PB+QC (conclusion)" input according to user operation is displayed with discrimination in green in the text area 210b.

Then, the corresponding portion of the conclusion equation, "PQ=PB+QC (conclusion)" is detected in the user drawn figure, the corresponding portion is deformed to match a figure portion obtained by the conclusion equation, and the content represented by the conclusion equation is illustrated in the user drawn figure displayed with discrimination in green. Specifically, a horizontal striped pattern is drawn with bold lines near the side PQ and a diagonal striped pattern is drawn with bold lines near the side PB and the side QC which correspond to each other, and each is displayed with discrimination in green (step S34).

Operation Example 2

Figure 8B:
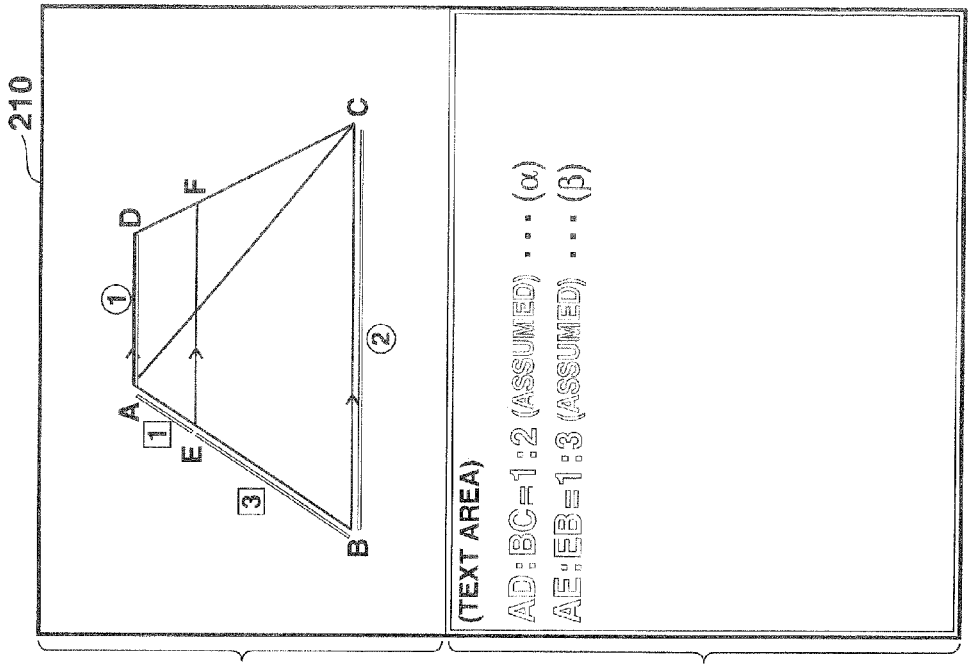
FIG. 8A and FIG. 8B are diagrams showing contents displayed on the display.
Figure 8A:
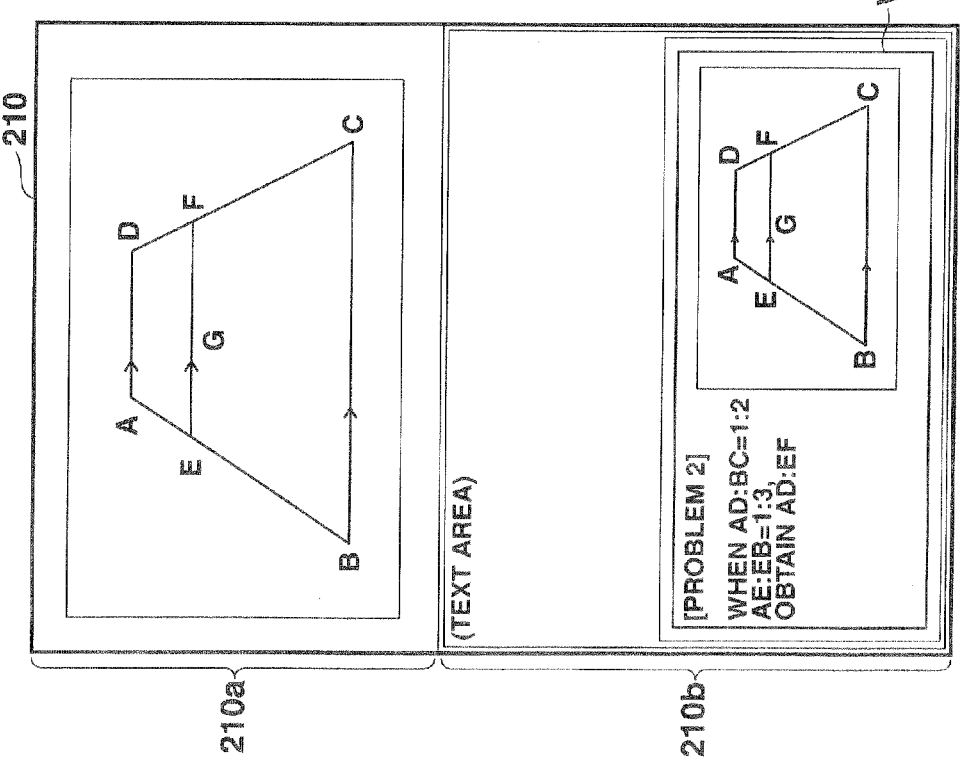

First, when the user performs the operation to specify educational material of a calculation problem of a figure (step S1; Yes), as shown in FIG. 8A, the figure area 210a and the text area 210b are formed on the display 210, the educational material display window W is displayed in the nearer side than the above areas and the specified educational material is displayed in the educational material display window W (step S2).

Next, when the user performs the operation to draw the figure (step S3; Yes), the user drawn figure drawn according to user operation is displayed in the figure area 210a (step S4).

Next, when the user performs operation to input the assumed equation (step S11; Yes), as shown in FIG. 8B, the assumed equations "AD:BC=1:2 (assumed)", "AE:EB=1:3 (assumed)" input according to user operation are displayed with discrimination in red in the text area 210b (step S12). In the present operation example, when the user inputs the equation, the number of the equation is automatically converted to "α", "β", etc. and the above is added to the end of the equation.

Then, the corresponding portions "AD", "BC", "AE", "EB" of the assumed equations "AD:BC=1:2 (assumed)", "AE:EB=1:3 (assumed)" are detected in the user drawn figure, the corresponding portions are deformed to match a figure portion obtained by the assumed equation, and the content represented by the assumed equation is illustrated in the user drawn figure and displayed with discrimination in red. Specifically, the numeric values "1", "2" of each term are described in the circle mark showing the same ratio equation in the side AD and the side BC corresponding to "AD:BC=1:2" and displayed with discrimination in red. Moreover, the numeric values "1", "3" of each term are described in the square mark showing the same ratio equation in the side AE and the side EB corresponding to "AE:EB=1:3" and displayed with discrimination in red (step S14).

Figure 9A:
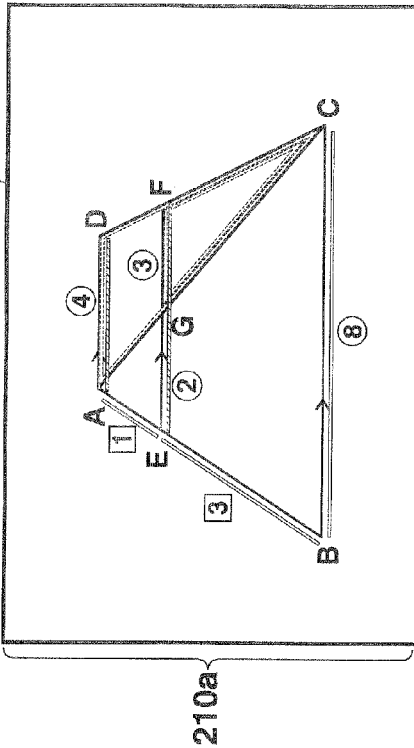
FIG. 9A and FIG. 9B are diagrams showing contents displayed on the display.

Next, when the user performs operation to input the proof process equation (step S21; Yes), as shown in FIG. 9A the proof process equations "△AEG ∽ △ABC", "EG:BC=1:4", "△CFG ∽ △CDA", "AD:GF=4:3" input according to user operation are displayed with discrimination in blue in the text area 210b and the corresponding portions of the proof process equation are detected in the user drawn figure (step S22).

Then, the corresponding portions of the proof process equations are detected in the user drawn figure, the corresponding portions are deformed to match a figure portion obtained by the proof process equation, and the content represented by the proof process equation is illustrated in the user drawn figure and displayed with discrimination in blue. Specifically, a triangle a little smaller showing the triangles are similar is drawn and displayed with discrimination in blue on the inside of △AEG and △ABC corresponding to "△AEG ∽ △ABC". The numeric values "1", "4" of each term are described in the triangle mark showing the same ratio equation in the side EG and the side BC corresponding to "EG:BC=1:4" and displayed with discrimination in blue. A triangle a little smaller showing the triangles are similar is drawn and displayed with discrimination in blue on the inside of △CFG and △CDA corresponding to "△CFG ∽ △CDA". The numeric values "4", "3" of each term are described in the upside-down triangle mark showing the same ratio equation in the side AD and the side GF corresponding to "AD:GF=4:3" and displayed with discrimination in blue (step S24).

Next, when the user performs operation to organize the numeric value of the ratio equation (step S41; Yes), after it is judged that a plurality of ratio equations are input (step S42; Yes), among the plurality of input ratio equations, it is judged that the terms "AD", "BC" showing the portion in the figure are common between two ratio equations among "AD:BC=1:2 (assumed)", "EG:BC=1:4", "AD:GF=4:3" (step S43; Yes), and the message M4 to confirm whether it is alright to organize the value of the ratio is displayed.

Figure 9B:
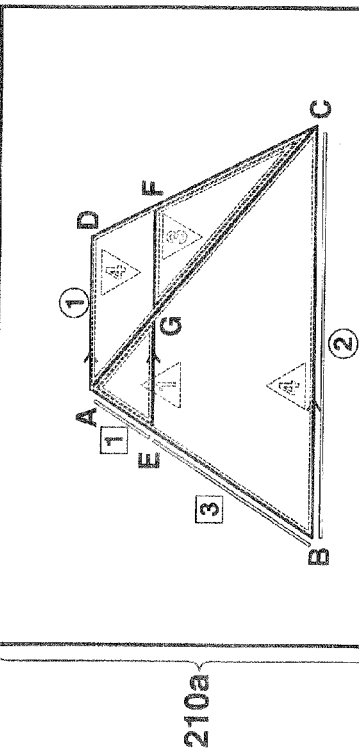

Next, when the user performs the operation to organize the value of the ratio, as shown in FIG. 9B, the numeric value of the ratio in the figure area 210a is updated (step S44).

Next, when the user performs the operation to input the conclusion equation (step S31; Yes), as shown in FIG. 9B, the ratio organizing processing is performed so that the value of each side of each related ratio equation becomes a value in a common ratio equation (for example, x, y, z, w of AD:GF:EG:BC=x:y:z:w). Specifically, according to AD:GF=4:3 in the drawing, the numeric value of the ratio of AD is set to 4. Next, the numeric value of the ratio of BC is set to 8 from AD:BC=1:2. The numeric value of the ratio of EG is set to 2 from EG:BC=1:4. The above values are displayed in each corresponding position in the figure with a numeric value surrounded by a circle mark showing the same ratio equation as the value of the common ratio equation (values of "4, 3, 2, 8" of common ratio equation "AD:GF:EG:BC=4:3:2:8"). Then, the conclusion equation "AD:EF=4:5 (conclusion)" input according to user operation is displayed with discrimination in green in the text area 210b.

Then, the corresponding portion of the conclusion equation "AD:EF=4:5 (conclusion)" is detected in the user drawn figure, the corresponding portion is deformed to match a figure portion obtained by the conclusion equation and the content represented by the conclusion equation is illustrated in the user drawn figure displayed with discrimination in green. Specifically, side AD and side EF are displayed with discrimination in green corresponding to "AD:EF=4:5" (step S24).

According to the present embodiment, as shown in steps S14, S24, S34 of FIG. 2 and as shown in FIG. 4A to FIG. 9B, etc., when the equation regarding the figure is input according to user operation, the corresponding portion of the equation is deformed to match a figure portion obtained by the equation and the content represented in the equation is illustrated in the figure displayed with discrimination. Therefore, it is easy to understand the corresponding relation between the displayed figure and the equation input by the user. Therefore, it is possible to enhance the effect of learning compared to conventional methods.

As shown in steps T3 to T4 of FIG. 3 and as shown in FIG. 8A, FIG. 8B, etc., when the equation regarding at least two angles in the congruent figure portion or the similar figure portion in the figure is input, it is judged whether or not the order of the sign showing the angles in the equation is reversed. When it is judged that the order is reversed, an error message notifying the above and a query message of whether or not to correct the order is displayed. Since the order is corrected according to the user operation to correct the order, even if the order of the sign is input in the equation incorrectly, it is possible to correct the order with easy operation.

As shown in steps T1 to T2 of FIG. 3 and as shown in FIG. 5A, FIG. 5B, etc., when the corresponding portion of the equation does not exist in the figure, an error message notifying the above is displayed and the corresponding portion of the equation is formed in the figure according to user operation. Therefore, even if an equation regarding a portion which is not defined in the figure is input, the corresponding portion of the equation can be reliably formed in the figure.

As shown in steps S14, S24, S34 of FIG. 2, and as shown in FIG. 8A to FIG. 9B, etc., when the ratio equation regarding the portion of the figure is input, the corresponding portion of the ratio equation in the figure is deformed to match a figure portion obtained by the ratio equation, and the content represented by the ratio equation is illustrated in the figure by adding the mark showing the ratio equation and the numeric value of the ratio of the ratio equation in the corresponding locations. Therefore, it is possible to easily understand the corresponding relation between the displayed figure and the equation input by the user. Consequently, it is possible to enhance the effect of learning compared to conventional methods.

As shown in steps S42 to S44 of FIG. 2 and as shown in FIG. 9A, FIG. 9B, etc., when a plurality of ratio equations are input and there are common terms showing the portion of the figure in at least two ratio equations among the plurality of ratio equations, the value of the ratio is organized according to user operation and the corresponding portion of the ratio equation in the figure is deformed to match a figure portion obtained by the ratio equation again and the content represented by the ratio equation is illustrated in the figure. Therefore, it is possible to easily grasp the relation among the lines and the relation of the sizes among the angles in the figure. Consequently, it is possible to enhance effect of learning.

The detailed configuration and the detailed operation of the elements composing the display terminal 1 of the present embodiment can be suitably modified without leaving the scope of the present invention.

For example, the figure display device of the present invention is described as the display terminal 1, however, the product in which the present invention can be applied is not limited to the above. For example, the present invention can be applied to electronic devices in general, such as a scientific calculator, a portable telephone, a personal computer, a PDA (Personal Digital Assistant), game machine and the like. Moreover, the figure display program 240 of the present invention can be stored in a memory card removable from the display terminal 1, CD, etc.

Figure 10:
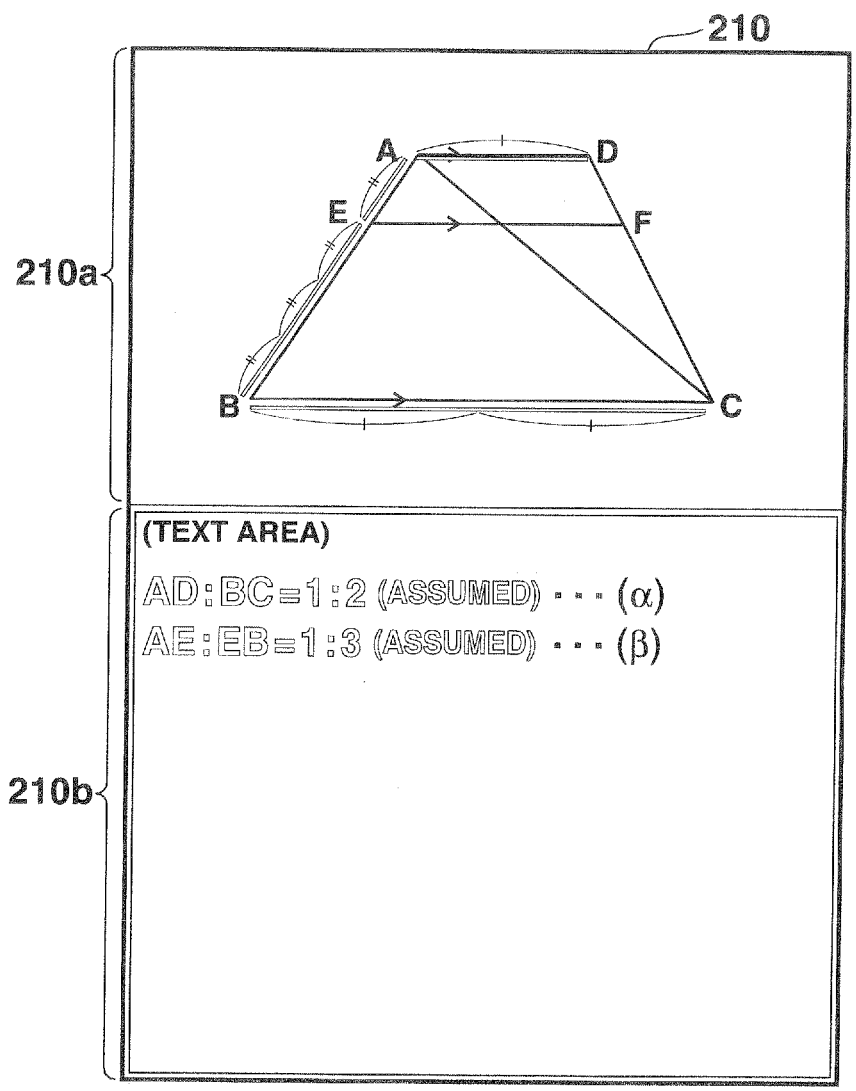
FIG. 10 is a diagram showing contents displayed on the display.

When the ratio equation is input, the present embodiment is described to illustrate the numeric value of the ratio equation in the corresponding portion of each term in the user drawn figure. However, as shown in FIG. 10, for example, the above can be illustrated by aligning a plurality of same length symbols or same angle symbols.

Although various exemplary embodiments have been shown and described, the invention is not limited to the embodiments shown. Therefore, the scope of the invention is intended to be limited solely by the scope of the claims that follow and its equivalents.

The entire disclosure of Japanese Patent Application No. 2012-061332 filed on Mar. 19, 2012 including specification, claims, drawings and abstract are incorporated herein by reference in its entirety.

What is claimed is:

1. A figure display device comprising:
a display; and
a processor which is configured to:
  display a figure on the display;
  input an equation regarding the figure according to a user operation;
  detect a portion in the figure corresponding to the input equation; and
  display with discrimination in the displayed figure, content represented by the input equation,
wherein the input equation is a ratio equation corresponding to the portion in the figure; and
wherein the processor is further configured to:
  detect the portion in the figure corresponding to the ratio equation;
  display content represented by the ratio equation in the detected corresponding portion in the figure;
  judge whether or not an identifier in the entered equation is defined in the displayed figure;
  when it is judged that the identifier in the entered equation is defined in the displayed figure, judge whether or not an order of a sign of the identifier is in reverse;
  when it is judged that the order of the sign of the identifier is in reverse, display an error message and a query message regarding whether or not to correct the order; and
  correct the order of the sign of the identifier based on a user operation requesting that the order be corrected.

2. The figure display device according to claim 1, wherein the processor is further configured to:
  when it is judged that the identifier is defined in the displayed figure, detect a portion of the displayed figure that corresponds to the identifier and deform a shape of the figure to match the entered equation.

3. The figure display device according to claim 1, wherein the input equation is an equation showing similar triangles; and
  wherein the processor is further configured to display with discrimination, content of the similar triangles represented by the input equation in each triangle.

4. The figure display device according to claim 1, wherein the processor is further configured to:
  judge whether or not a plurality of ratio equations are input and whether or not there is a common term representing a portion of the figure in at least two ratio equations from among the plurality of ratio equations; and
  organize a value of a ratio to update a display content, when it is judged that the plurality of ratio equations are input and that there is the common term representing the portion of the figure in said at least two ratio equations from among the plurality of ratio equations.

5. The figure display device according to claim 1, wherein the sign of the identifier shows an angle or a side.

6. The figure display device according to claim 1, wherein the processor is further configured to:
  when it is judged that the identifier is not defined in the displayed figure, set in the figure a portion of the displayed figure which corresponds to the undefined identifier based on a user operation; and
  deform the set portion of the displayed figure to match the entered equation.

7. The figure display device according to claim 1, wherein the processor is further configured to:
  when a given portion of the equation does not exist in the figure, display an error message indicating that the given portion of the equation does not exist in the figure,
  when the error message is displayed, set in the figure a portion of the displayed figure which corresponds to the given portion of the equation, based on a user operation, and
  deform the set portion of the displayed figure to match the entered equation.

8. A method of a figure display device which comprises a display and a processor, the method comprising:
  displaying a figure on the display;
  inputting an equation regarding the figure according to a user operation;
  detecting a portion in the figure corresponding to the input equation;
  displaying with discrimination in the displayed figure, content represented by the input equation, wherein the input equation is a ratio equation corresponding to the portion in the figure;
  detecting the portion in the figure corresponding to the ratio equation;
  displaying content represented by the ratio equation in the detected corresponding portion in the figure;
  judging whether or not an identifier in the entered equation is defined in the displayed figure;
  when it is judged that the identifier in the entered equation is defined in the displayed figure, judging whether or not an order of a sign of the identifier is in reverse;
  when it is judged that the order of the sign of the identifier is in reverse, displaying an error message and a query message regarding whether or not to correct the order; and
  correcting the order of the sign of the identifier based on a user operation requesting that the order be corrected.

9. A non-transitory computer-readable recording medium having stored thereon a program for a computer of a figure display device which comprises a display, the program causing the computer to perform functions comprising:
   displaying a figure on the display;
   inputting an equation regarding the figure according to a user operation;
   detecting a portion in the figure corresponding to the input equation;
   displaying with discrimination in the displayed figure, content represented by the input equation, wherein the input equation is a ratio equation corresponding to the portion in the figure;
   detecting the portion in the figure corresponding to the ratio equation;
   displaying content represented by the ratio equation in the detected corresponding portion in the figure;
   judging whether or not an identifier in the entered equation is defined in the displayed figure;
   when it is judged that the identifier in the entered equation is defined in the displayed figure, judging whether or not an order of a sign of the identifier is in reverse;
   when it is judged that the order of the sign of the identifier is in reverse, displaying an error message and a query message regarding whether or not to correct the order; and
   correcting the order of the sign of the identifier based on a user operation requesting that the order be corrected.

* * * * *